(12) United States Patent
Williams et al.

(10) Patent No.: US 6,560,519 B2
(45) Date of Patent: May 6, 2003

(54) ROLLOVER-SENSING SYSTEM FOR A VEHICLE AND METHOD OF OPERATING THE SAME

(75) Inventors: Kyle W. Williams, Auburn Hills, MI (US); Frank-Juergen Stuetzler, Farmington Hills, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 09/893,924

(22) Filed: Jun. 28, 2001

(65) Prior Publication Data

US 2003/0004627 A1 Jan. 2, 2003

(51) Int. Cl.[7] .................... G06F 19/00; B60R 21/00
(52) U.S. Cl. .................. 701/45; 701/38; 280/5.506; 280/755
(58) Field of Search ............... 701/45, 38, 41; 280/5.506, 5.507, 5.508, 728.1, 734, 735, 755; 180/282; 340/440

(56) References Cited

U.S. PATENT DOCUMENTS

| | | | | |
|---|---|---|---|---|
| 5,468,013 A | 11/1995 | Gille | | 280/729 |
| 5,602,734 A | 2/1997 | Kithil | | 701/45 |
| 5,610,575 A | 3/1997 | Gioutsos | | 340/429 |
| 5,802,479 A | 9/1998 | Kithil et al. | | 701/45 |
| 5,835,873 A | 11/1998 | Darby et al. | | 701/45 |
| 5,890,084 A | * 3/1999 | Halasz et al. | | 701/45 |
| 6,002,974 A | 12/1999 | Schiffmann | | 701/36 |
| 6,002,975 A | 12/1999 | Schiffmann et al. | | 701/36 |
| 6,014,602 A | 1/2000 | Kithil et al. | | 701/45 |
| 6,038,495 A | * 3/2000 | Schffmann | | 701/1 |
| 6,084,314 A | 7/2000 | McCurdy | | 307/10.1 |
| 6,104,284 A | 8/2000 | Otsuka | | 340/440 |
| 6,123,355 A | 9/2000 | Sutherland | | 280/728.2 |
| 6,141,604 A | * 10/2000 | Mattes et al. | | 701/1 |
| 6,169,946 B1 | 1/2001 | Griessbach | | 701/45 |
| 6,170,594 B1 | 1/2001 | Gilbert | | 180/282 |
| 6,178,375 B1 | 1/2001 | Breunig | | 701/124 |
| 6,186,539 B1 | 2/2001 | Foo et al. | | 280/735 |
| 6,192,305 B1 | * 2/2001 | Schiffmann | | 701/45 |
| 6,282,474 B1 | * 8/2001 | Chou et al. | | 701/45 |
| 6,292,759 B1 | * 9/2001 | Schiffmann | | 702/151 |

(List continued on next page.)

FOREIGN PATENT DOCUMENTS

| | | |
|---|---|---|
| DE | 10019416 A1 | 10/2001 |
| DE | 10019417 A1 | 10/2001 |
| EP | 1089898 | 4/2001 |
| EP | 10010633 A1 | 9/2001 |
| WO | WO01/64482 | 9/2001 |

OTHER PUBLICATIONS

U.S. patent application Ser. No. 09/720,602, Mattes et al., filed Mar. 1, 2001.
U.S. patent application Ser. No. 10/018,916, Mattes et al., filed Apr. 2001.
U.S. patent application Ser. No. 10/018,918, Mattes et al., filed Apr. 5, 2001.

*Primary Examiner*—Tan Q. Nguyen
(74) *Attorney, Agent, or Firm*—Michael Best & Friedrich, LLP

(57) ABSTRACT

A method and system of activating a safety device of a vehicle having x, y and z-axes. The method includes generating a y-acceleration signal representative of the acceleration of the vehicle in the y-axis, generating an angular-rate signal representative of the angular velocity of the vehicle with respect to the x-axis, calculating a vehicle angle having a relationship to the angular-rate signal and being representative of the angle of the vehicle about the x-axis, determining an angular-rate threshold having a relationship to the vehicle angle and the y-acceleration signal, comparing the angular-rate signal to the angular-rate threshold, and activating a safety device when the magnitude of the angular-rate signal is greater than the angular-rate threshold.

54 Claims, 5 Drawing Sheets

U.S. PATENT DOCUMENTS 6,301,536 B1 * 10/2001 Vaessen et al. ............... 701/45
6,324,446 B1 * 11/2001 Brown et al. .................. 701/1
6,332,104 B1 * 12/2001 Brown et al. .................. 701/1
6,363,306 B1 * 3/2002 Palmertz et al. .............. 701/45

* cited by examiner

ROLLOVER-SENSING SYSTEM FOR A VEHICLE AND METHOD OF OPERATING THE SAME

BACKGROUND OF THE INVENTION

The invention relates to a rollover-sensing system, and particularly to a rollover-sensing system that senses trip rollover events, and activates at least one safety device in response to sensing the trip rollover event.

Vehicle rollover events are situations where vehicle occupants are at risk of serious injury. To reduce the risk of injury, a vehicle may include a rollover sensing system that senses when a vehicle rollover event occurs, or more precisely, senses the occurrence of conditions that are indicative of a rollover event occurring. A rollover event occurs very quickly and in order to activate safety devices in time to protect vehicle occupants, a rollover sensing system must act at the beginning of the event. In use, most systems make decisions based on data that indicates that the vehicle will or is likely to rollover. Nevertheless, such systems are often explained in terms of detecting the occurrence of a rollover event even though the systems act before the vehicle has fully rolled over. This convention is followed in the discussion below.

Rollover events can be categorized in three groups. An upward rollover event occurs when the vehicle is traveling in a forward direction, and then travels across an object or an inclined surface resulting in an upward roll. A downward rollover event occurs when the vehicle is traveling in a forward direction, and then travels across an object or a declinated surface resulting in a downward roll. A third type of rollover event is a "trip" rollover event. The trip rollover event occurs when the vehicle is initially traveling in a forward direction, rotates about the z-axis of the vehicle such that the vehicle is "sliding" sideways, and travels or "trips" across an "object" resulting in a vehicle roll. The object may be a curb, a depression, a location where there is a change in the coefficient of friction of the surface upon which the vehicle is travelling, or a similar item.

SUMMARY OF THE INVENTION

Some prior rollover-sensing systems sense upward or downward rollover events. Most vehicle manufacturers typically require that one or more safety devices be activated approximately 700 ms after the upward or downward rollover event begins. However, for trip rollover events, vehicle manufacturers requires that safety devices be activated within approximately 200 ms. One reason for the shorter activation time in trip rollover events is that such rollovers cause the occupants to continue moving sideways at great velocities. Unless the occupants' speed is reduced, they may collide into a side window or eject from the vehicle. In order for the system to deploy a safety device quickly, the trip rollover event requires faster fire or activation times. Prior rollover-sensing systems are unable to consistently predict likely trip rollover events such that the system activates safety devices within the required activation time.

Accordingly, in one embodiment, the invention provides a rollover sensing system designed for use with an overland vehicle with x, y and z-axes and a frame. The system includes an accelerometer connected to, or mounted on or in the frame. The accelerometer is operable to generate a y-acceleration signal representative of the acceleration of the vehicle in the direction of the y-axis. The system also includes an angular-rate sensor connected to, or mounted on or in the frame. The angular-rate sensor is operable to generate an angular rate signal representation of the angular velocity of the vehicle about the x-axis. The system also includes a processor such as a microcontroller and coupled to the accelerometer and the angular-rate sensor. The microcontroller is operable to receive the y-acceleration signal and the angular-rate signal and calculate a vehicle angle having a relationship to the angular-rate signal. The calculated vehicle angle is representative of the angle of the vehicle about the x-axis. The microcontroller also determines an angular-rate threshold having a relationship to the vehicle angle and the y-acceleration signal, compares the angular-rate signal to the angular-rate threshold, and generates an output signal when a magnitude of the angular-rate signal is greater than the angular-rate threshold. The output signal is preferably transmitted or sent to a safety device of the vehicle. The safety device is activatable in response to receiving the output signal.

The invention also provides a method of activating a safety device of a vehicle having x, y and z-axes. The method includes generating a y-acceleration signal representative of the acceleration of the vehicle in the y-axis, generating an angular-rate signal representative of the angular velocity of the vehicle with respect to the x-axis, and calculating a vehicle angle having a relationship to the angular-rate signal and being representative of the angle of the vehicle about the x-axis. The method also includes determining an angular-rate threshold having a relationship to the vehicle angle and the y-acceleration signal, comparing the angular-rate signal to the angular-rate threshold, and activating a safety device when a magnitude of the angular-rate signal is greater than the angular-rate threshold.

The microcontroller determines an angular-rate threshold having a relationship to the y-acceleration of the vehicle in the direction of the y-axis, and the angle of the vehicle about the x-axis. Using both the y-acceleration and the angle for calculating the angular-rate threshold reduces the firing times for activating safety devices. For example, if the y-acceleration is high, which signifies a trip rollover event, then the rollover-sensing system of the invention reduces the angular-rate threshold, allowing the safety device to activate earlier than if the y-acceleration is low. This results in the system being more responsive to a trip rollover event.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
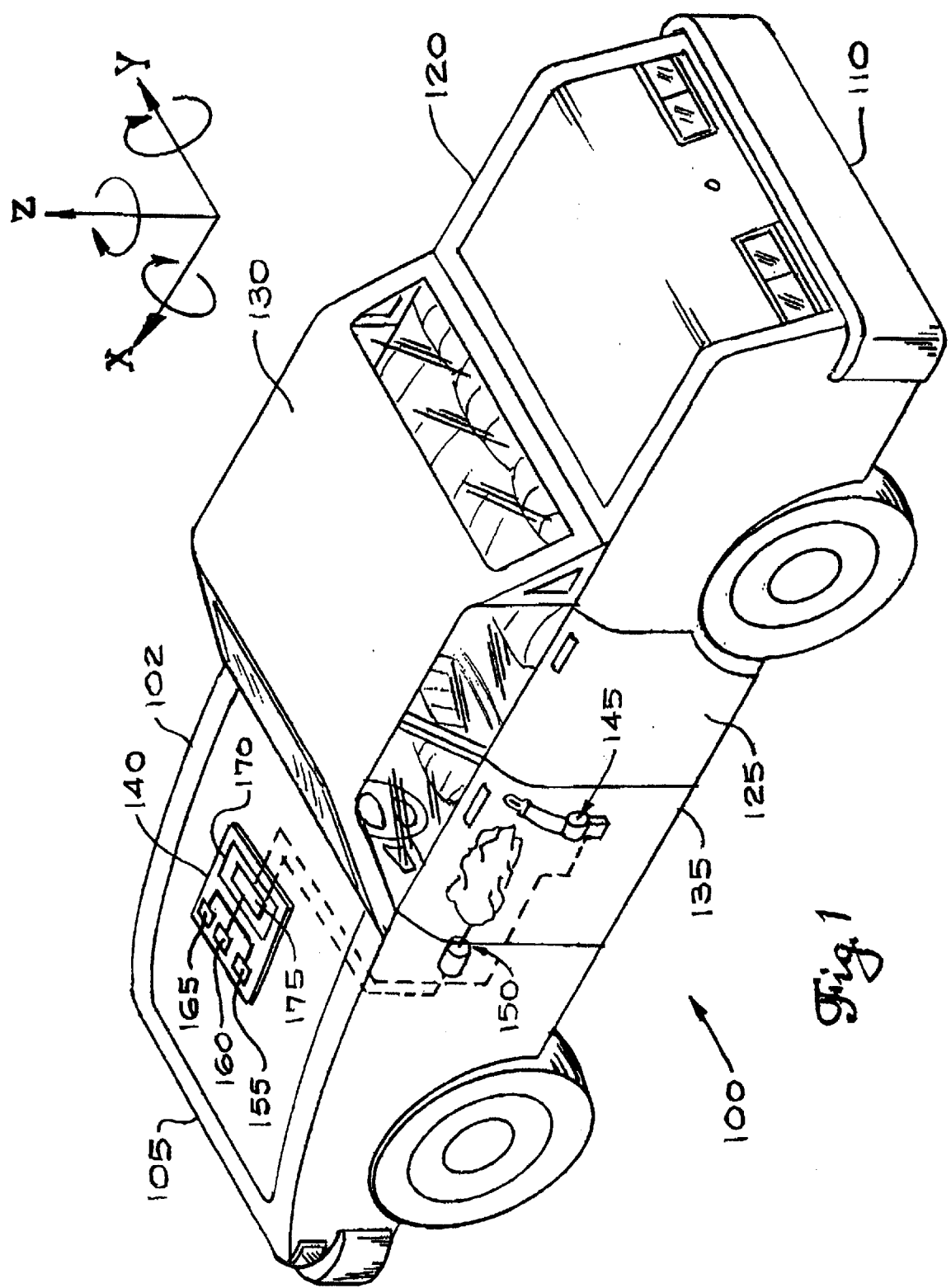
FIG. 1 is an illustration of a vehicle equipped with a rollover-sensing system of one embodiment of the invention.

A vehicle 100 equipped with a rollover detection system of one embodiment of the invention is shown in FIG. 1. As used herein, the term vehicle is defined as including any automobile, car, truck, van, bus, tractor or similar apparatus. The vehicle 100 includes a frame 102, a front 105, a rear 110, and has x, y and z-axes referenced to the vehicle. The x or roll axis extends through the front 105 and rear 110 of the vehicle, the y or pitch axis extends through sides 120 and 125 of the vehicle, and the z or yaw axis extends through top 130 and bottom 135 of the vehicle. The vehicle 100 is equipped with a rollover-sensing system 140 (shown schematically) and one or more safety devices (e.g., a seat-belt restraint system 145, and an air-bag deployment system 150). The rollover-sensing system 140 is mounted to the frame 102, and generally includes an angular rate sensor 155, one or more accelerometers (e.g., y-accelerometer 160 and z-accelerometer 165), and a processor such as a microcontroller 170. The exemplary rollover-sensing system 140 also includes a y-accelerometer and a z-accelerometer.

The angular-rate sensor 155 is a device that senses an angular rate or angular velocity of the vehicle about the x-axis, and generates an angular-rate signal correlated with the angular rate of the vehicle. The angular-rate signal is provided to the microcontroller 170. An exemplary angular-rate sensor 155 of the invention is a CMG044-MM2 angular rate sensor chip manufactured by Robert Bosch GmbH.

The y-accelerometer 160 senses the inertial reaction of the vehicle in the y-axis, and generates a y-acceleration signal representative of the y-acceleration of the vehicle. The z-accelerometer 165 senses the inertial reaction of the vehicle in the z-axis, and generates a z-acceleration signal representative of the z-acceleration of the vehicle. Although the y and z-accelerometers are shown separately, they may be combined into one chip. For example, an exemplary accelerometer chip of the invention that provides y and z-acceleration is an SMB100 accelerometer chip manufactured by Robert Bosch GmbH.

The microcontroller 170 receives the angular rate, y-acceleration, and z-acceleration signals, analyzes the signals to determine if a rollover condition exists, and generates one or more output signals (which are also referred to herein as activation signals, or fire signals) to control or activate the one or more safety devices 145 and 150. For the embodiment shown, the microcontroller 170 includes a processing unit and memory on a single chip 175. The memory includes one or more software modules (which may also be referred to herein as software blocks) having instructions. The processing unit obtains, interprets and executes the instructions according to the description provided below. Although the microcontroller 170 is shown and described, the invention may be implemented with other devices including a variety of integrated circuits (e.g., an application-specific-integrated circuit) and discrete devices, as would be apparent to one of ordinary skill in the art.

The one or more safety devices, a seat-belt pretensioner or restraint system 145 and an airbag deployment system 150, are coupled to the microcontroller 170 and are activated in response to control signals generated by the microcontroller 170. Although the description herein is limited to the airbag-deployment system 150, and the seat-belt restraint system 140, other devices may be used (e.g., roll bars, automatic locks, and other existing and yet to be developed safety devices).

The air-bag deployment system 150, which is well known in the art, includes an air bag and a gas supply for inflating the bag. As shown in FIG. 1, the air bag is a side deployment air bag for the driver. However, other air-bag deployment systems may be added, including systems for other occupants and for other deployment positions (e.g., a front deployment).

The seat-belt restraint system 145, which is well known in the art, includes a seat belt and a pretensioner device for controlling slack in the seat belt. The pretensioner device removes slack or provides tension to the seat belt upon receiving a control signal from the microcontroller 170. Although only one seat belt retention system 145 is shown, other systems may be included for other passengers of the vehicle.

The vehicle 100 further includes a power source (not shown) that provides power to the rollover-sensing system 140, the airbag deployment system 150 and the seat belt restraint systems 145. For example, the power source may be a battery.

Figure 2A:
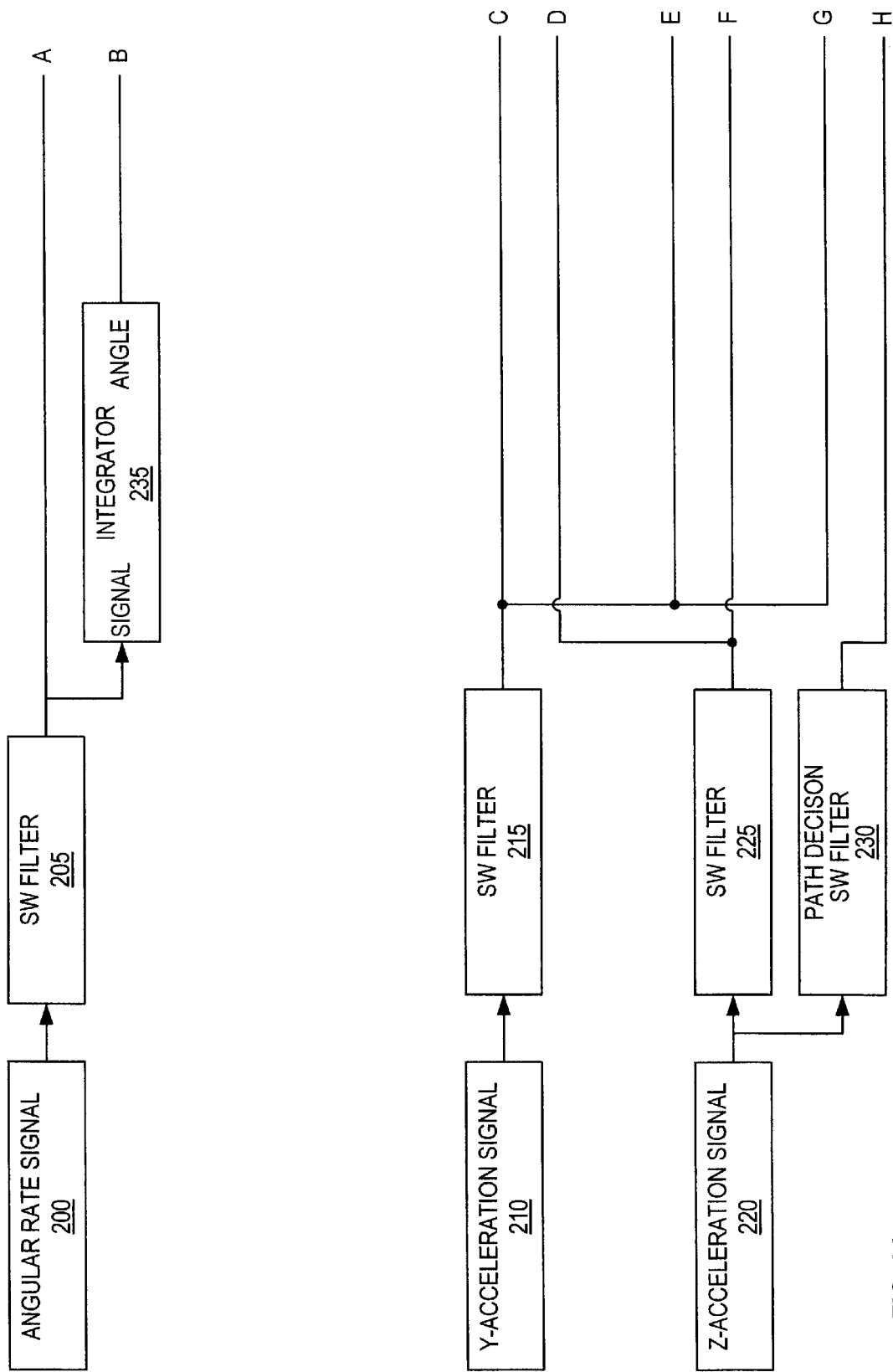
FIGS. 2a and 2b are schematic diagrams of a system for activating one or more safety devices.
Figure 2B:
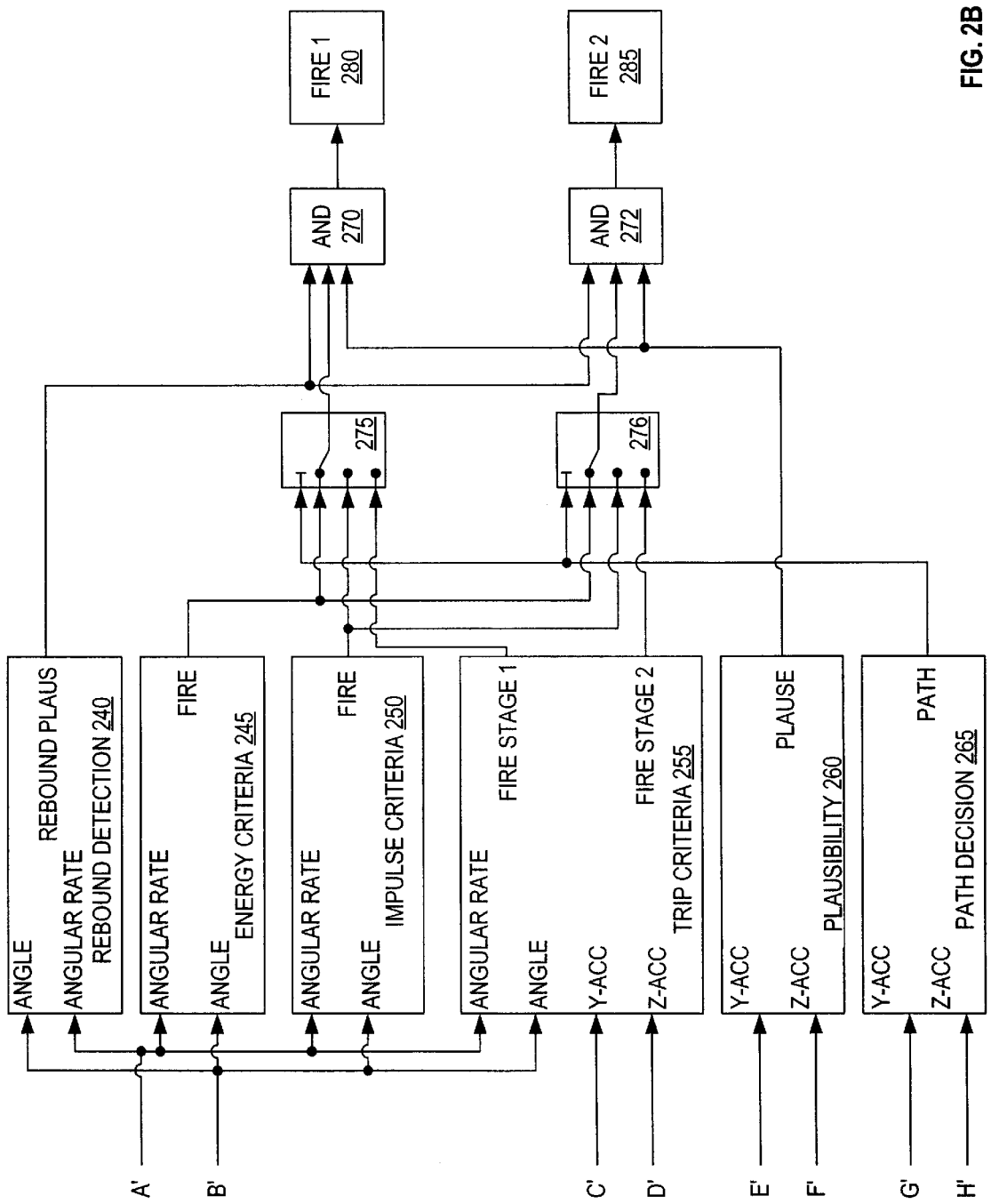

Upon activating the vehicle 100 (i.e., turning the vehicle "on") the power source provides power to the system 140. Upon receiving power, the microcontroller 170 performs appropriate initialization operations and obtains, interprets, and executes one or more software modules from the memory. For the embodiment shown, the microcontroller executes instructions to analyze the angular rate signal, the y-acceleration signal and the z-acceleration signal to determine if a rollover condition exists. One way of analyzing the angular rate signal, the y-acceleration signal, and the z-acceleration signal is shown schematically in FIGS. 2a and 2b. FIGS. 2a and 2b illustrate functional blocks (such as filters, integrators, logic gates, switches, and other similar functional representations) which could be implemented in hardware, but are preferably implemented in software executed by the microcontroller 170. One of ordinary skill in the art could readily generate software to implement an embodiment of the invention based on the function block illustrations and description provided herein.

As shown in FIGS. 2a and 2b, the angular-rate signal 200 is provided to an angular-rate software filter 205 that removes noise from the angular rate signal. Similarly, the y-acceleration signal 210 is provided to a y-acceleration software filter 215 that removes noise from the y-acceleration signal. The z-acceleration signal 220 is provided to a first z-acceleration software filter 225 that removes noise from the z-acceleration signal 220. In addition, the z-acceleration signal 220 is provided to a path decision software filter 230 that also removes noise from the z-acceleration signal 220.

The filtered angular rate (from module 205) is provided to an integrator 235, a rebound detection module or block 240, an energy criteria module or block 245, an impulse criteria module or block 250, and a trip criteria module or block 255. The filtered y-acceleration (from module 215) is provided to the trip criteria module 255, a plausibility module or block 260, and a path decision module or block 265. The filtered z-acceleration (from module 225) is provided to the trip criteria module 255 and the plausibility module 260. The filtered path decision z-acceleration (from module 230) is provided to the path decision module 265. As used herein the term module implies one or more software instructions that are executed by the microcontroller 170 to perform the function associated with the particular module or block.

The integrator 235 integrates the filtered angular rate to calculate a current vehicle angle about the x-axis. An exemplary integrator is the Rose brand integrator manufactured by Robert Bosch GmbH. The vehicle angle is provided to the rebound detection module 240, the energy criteria module 245, the impulse criteria module 250, and the trip criteria module 255.

The rebound detection module 240 receives the vehicle angle from the integrator 245 and the filtered angular rate from the software filter 205. The rebound detection module 240 analyzes the vehicle angle and the angular rate to determine whether the vehicle 100 returned to a "stable" state from an "unstable" state. For example, if the vehicle 100 is an automobile having four wheels, and if the vehicle 100 started to roll such that two wheels left the pavement (i.e., the vehicle has entered an "unstable" state) followed by all four wheels returning to the pavement (i.e., the vehicle has returned to the "stable" state), the rebound detection module 240 recognizes that the vehicle 100 returned from the roll, and ensures that a large angular rate signal 200 does not produce a fire decision. If the rebound detection module determines a rebound condition is not occurring, then a logic value of one is provided to AND gates or modules 270 and 272. Otherwise, a logic value of zero is provided to the AND gates 270 and 272. The rebound detection module 240 is known in the art and will not be discussed in further detail.

The energy criteria module receives the filtered angular rate from the software filter module 205 and the vehicle angle from the integrator 235. The energy criteria module analyzes the vehicle angle and the filtered angular rate to determine if an upward roll event is occurring. For example, in one embodiment, the energy criteria module creates an angular rate threshold based on the angle of the vehicle, and compares the magnitude of the actual angular rate with the angular rate threshold. If the energy criteria module 245 determines an upward roll is occurring (e.g., the magnitude of the angular rate is greater than the angular rate threshold), then the energy criteria module 245 provides a logic value of one to the first path-select module 275 and the second path-select module 276. Otherwise, a logic value of zero is provided to path-select modules 275 and 276. The energy criteria module 245 is known in the art and will not be discussed in further detail.

The impulse criteria module 250 receives the filtered angular rate from the software filter module 205 and the vehicle angle from the integrator 235. The impulse criteria module 250 analyzes the vehicle angle and the angular rate to determine whether a downward roll event is occurring. For example, in one embodiment, the impulse criteria module creates an angular rate threshold based on the angle of the vehicle, and compares the magnitude of the actual angular rate to the angular rate threshold. If a downward roll event is occurring (e.g., the magnitude of the angular rate is greater than the angular rate threshold), then the impulse criteria module 250 provides a logic value of one to the path-select modules 275 and 276. Otherwise, a logic value of zero is provided to path-select modules 275 and 276. The impulse criteria module 250 is known in the art and will not be discussed in further detail.

The trip criteria module 255 receives the filtered angular rate from the software filter 205, the vehicle angle from the integrator 235, the filtered y-acceleration from the software filter 215 and the filtered z-acceleration from the software filter 225. In general, and as discussed in further detail below, the trip criteria module 255 analyzes the angular rate, the vehicle angle, the y-acceleration, and the z-acceleration to determine whether a trip rollover event is occurring. If a condition or conditions indicative of a trip rollover occur, then a logic value of one is provided from "fire stage 1" (FIG. 2b) to the path select module 275. Otherwise, a logic value of zero is provided to path select module 275. If conditions indicative of a trip rollover are present or detected for a defined time period, then a logic value of one is provided from "fire stage 2" (FIG. 2b) to the path select module 276.

Figure 3A:
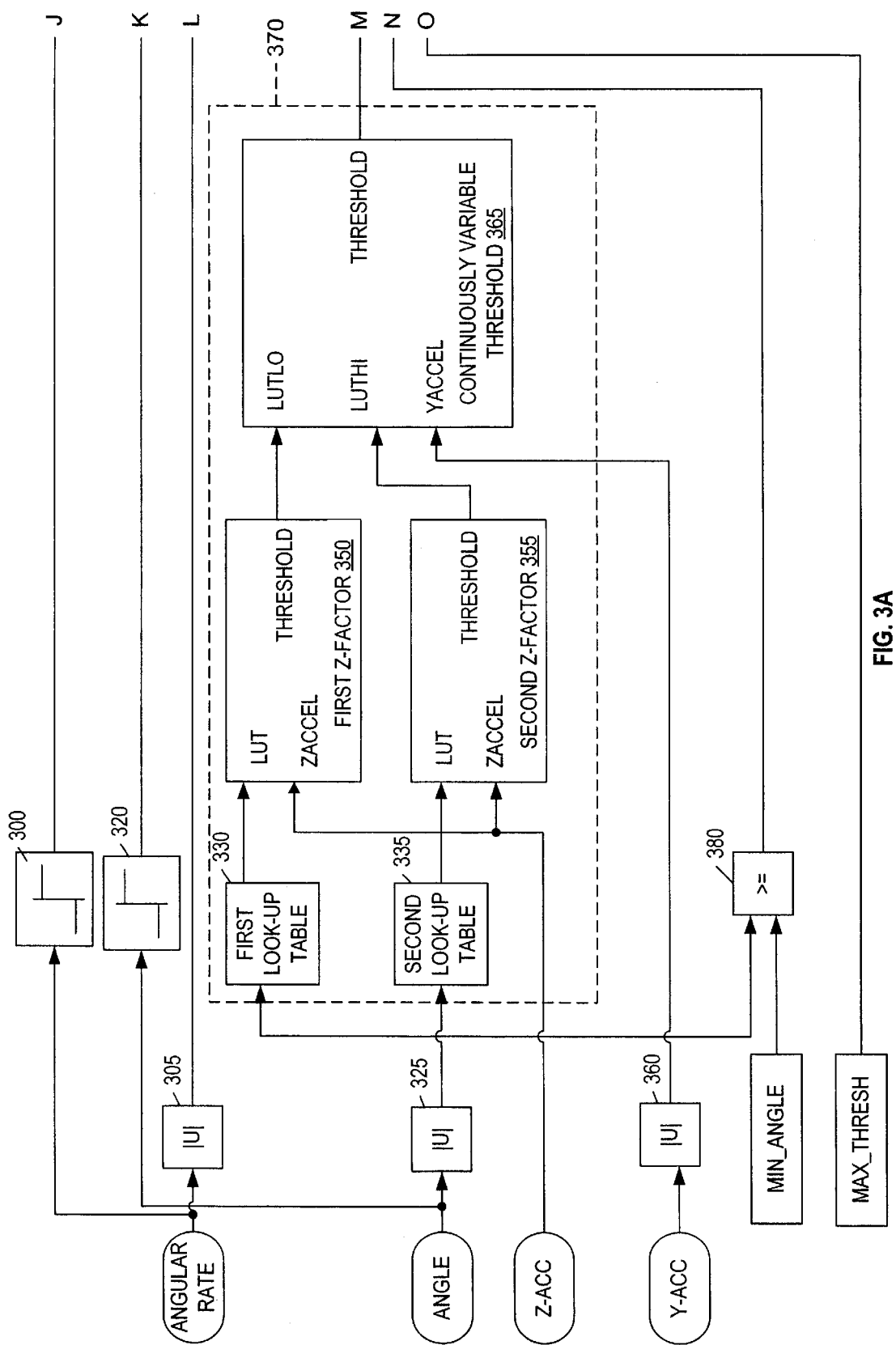
FIGS. 3a and 3b are schematic diagrams of a trip criteria module.
Figure 3B:
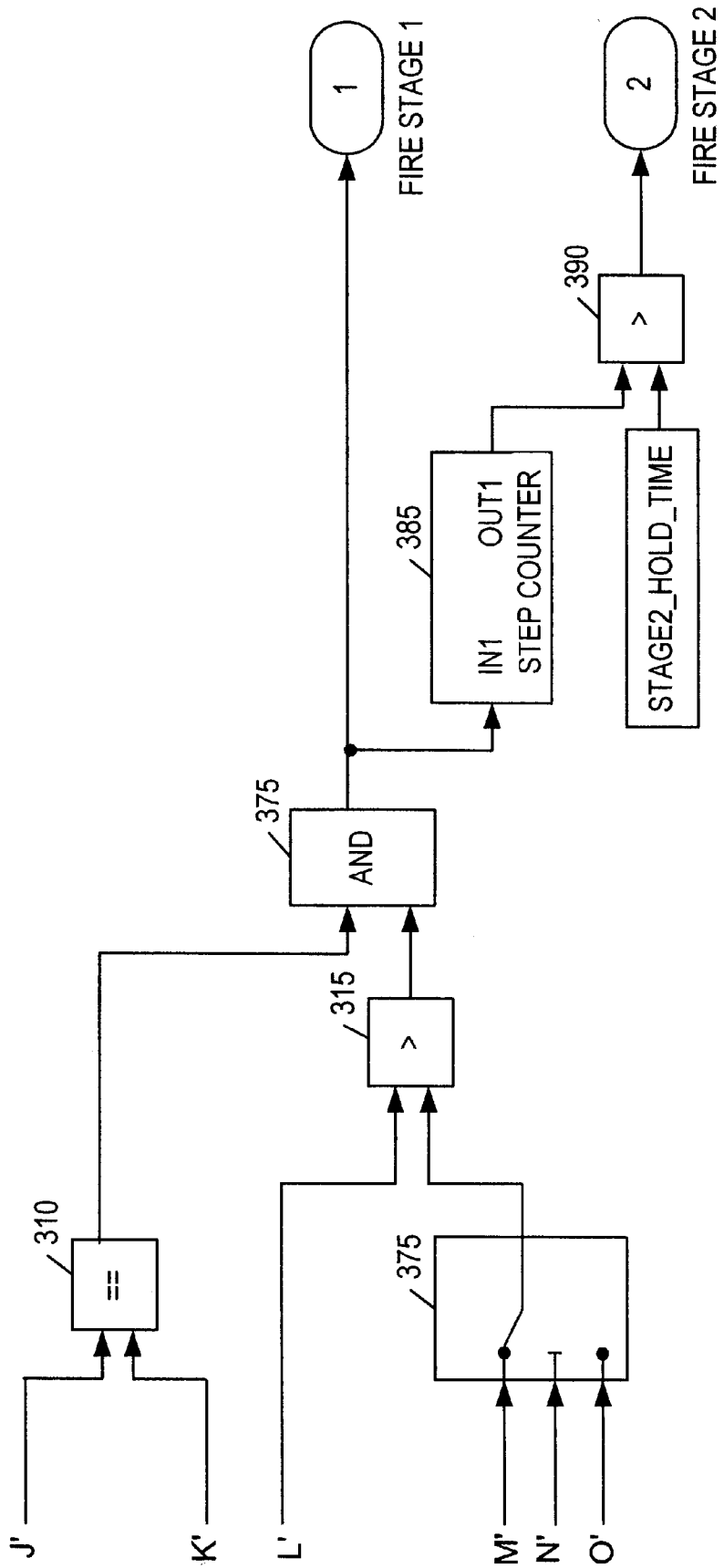

For example, if a trip rollover event is occurring, then the trip criteria module generates a first output signal (i.e., fire stage 1) signifying the event. The first signal activates a first safety device (e.g., the seat-belt pretensioner of the seat-belt restraint system 145). If a trip rollover event is sensed for a defined time period, then the trip criteria module generates a second output signal (i.e., fire stage 2) signifying the prolonged event. The second signal activates a second safety device (e.g., the side airbag of an air-bag deployment system 150). The two-stage firing process is beneficial for trip rollover events. Due to the firing time for trip rollover events being as low as 100 ms, the two-stage firing system of the invention helps to delay the final decision of activating the air-bag deployment system 150. When a trip rollover event is detected, the embodiment shown activates the seat-belt pretensioner to reduce slack in the seat belt around the occupant. This secures the occupant, and reduces the lateral speed of the occupant. Reducing the lateral speed of the occupant allows the system 140 more time to determine whether a likely trip rollover event is occurring. If the system determines a trip rollover event is occurring for a specified time period (e.g., 50 ms), then the side airbag is deployed to further reduce the lateral speed of the occupant. During the time period, the processor 175 may determine that the vehicle will likely return to a stable state (e.g., via the rebound detection module 240). If the vehicle will likely return to a stable state, only the seatbelt pretensioner was activated, preventing unwanted use of the side air bag. One embodiment of the trip criteria module is schematically shown in FIGS. 3a and 3b, and is discussed in further detail below.

The plausibility module 260 provides a second independent decision path for the processor 175 to determine whether a logic value of one produced by the energy criteria module 245, the impulse criteria module 250, or the trip criteria module is a valid determination. For example, in certain driving maneuvers, the angular rate and vehicle angle provided to the energy criteria module 245, the impulse criteria module 250, and the trip criteria module 255 may incorrectly, or falsely predict, a rollover condition. For example, the driving maneuver may be a slalom maneuver or a maneuver occurring on a banked curve such that the potential rollover decision does not make sense given the circumstances. The plausibility module 260 analyzes the filtered y-acceleration and the filtered z-acceleration to verify that a rollover condition exists. If the plausibility module determines a rollover condition exists, then a logic value of one is provided to the AND gates 270 and 272. Otherwise, a logic value of zero is provided to the AND gates 270 and 272.

The path-decision module 265 receives the filtered y-acceleration from the software filter 215 and the filtered z-acceleration from the software filter 230. The path decision module 265 generates a value that selects the logic decision generated by the energy-criteria module 245, impulse criteria module 250, or the trip criteria module 255. The value produced by the path decision module 265 is provided to the path-selection modules 275 and 276, which select the corresponding logic values generated by one of the criteria modules 245, 250 or 255.

For example, if the y-acceleration is greater than a y-acceleration threshold signifying a trip event, then the path decision module 265 generates a value that results in the path selection modules 275 and 276 outputting the fire-stage-1 and fire-stage-2 logic decisions of the trip criteria module 255, respectively. If the y-acceleration is less than the y-acceleration threshold, then the path decision module 265 analyzes the z-acceleration. If the z-acceleration is greater than the acceleration due to gravity, then the output of the energy criteria module 245 is selected by both path selection modules 275 and 276. If the z-acceleration is less than the acceleration due to gravity, then the output of the impulse criteria module 250 is selected by both path selection modules 275 and 276.

The AND gate 270 receives the rebound detection value provided by the rebound detection module 240, the criteria value provided by the path selection module 275, and the plausibility decision value from the plausibility module 260. If all three have a logic value of one, then a fire or activation signal is generated that results in a first safety device activating (e.g., the seat-belt pretensioner of the seatbelt restraint system 145). If any of the values provided to the AND gate 270 have a logic value of zero, then an activation signal is generated that results in none of the safety devices activating.

The AND gate 272 receives the rebound detection value provided by the rebound detection module 240, the criteria value provided by the path selection module 276, and the plausibility decision value from the plausibility module 260. If all three have a logic value of one, then a fire or activation signal is generated that results in a second safety device activating (e.g., the side airbag of the air-bag deployment system 145). If any of the values provided to the AND gate 270 have a logic value of zero, then an activation signal is generated that results in the second safety device not activating. Other AND gates may be added to activate other safety devices or to provide different relationships among the modules 240–265.

As was discussed above, the trip criteria module 255 senses whether a trip rollover event is occurring. One exemplary trip criteria module is shown in FIGS. 3a and 3b. As shown in FIGS. 3a and 3b, the filtered angular rate is provided to a first sign detection module 300 and a magnitude value module 305. As used herein, a sign detection module (e.g., module 300) generates a logic value signifying whether the value provided to the module is positive or negative. For example, if the angular rate is positive (e.g., the rotation is clockwise), a logic value of one is generated; if the angular rate is negative (e.g., the rotation is counter-clockwise), a logic value of zero is generated. A magnitude value module (e.g., module 305) generates an absolute value or magnitude of a signal or value being provided to the module. Referring back to FIGS. 3a and 3b, the sign of the angular rate is provided to comparator 310, and the magnitude of the angular rate (which is also referred to as the "angular-rate magnitude") is provided to comparator 315.

The filtered vehicle angle is provided to a second sign analysis module 320 and a second magnitude value module 325. The sign of the vehicle angle, signifying the angle of the vehicle about the x-axis, is provided to comparator 310. The magnitude of the vehicle angle (also referred to as the "vehicle-angle magnitude") is provided to a first look-up table 330, a second look-up table 335, and a comparator 340.

The filtered z-acceleration is provided to a first z-factor module 350 and a second z-factor module 355. The filtered y-acceleration is provided to a third magnitude value module 360. The magnitude value of the filtered y-acceleration (also referred to as the "y-acceleration magnitude") is provided to a continuously variable threshold module 365.

The first look-up table 330, the second look-up table 335, the first z-factor module 350, the second z-factor module 355, and the continuously variable threshold table 365 form an analysis module 370. In general, the analysis module 370 analyzes the vehicle angle, the z-acceleration and the y-acceleration to produce an angular rate threshold. The angular rate threshold is compared to the magnitude of the actual angular rate (at module 315) to determine if a trip rollover is occurring.

For the embodiment shown, the first look-up table 330 receives the vehicle angle and generates a first threshold value. The second look-up table 335 receives the vehicle angle and generates a second threshold value. The first and second threshold values are angular rate values representing the highest and lowest angular rate thresholds for the vehicle angle. For example and at a particular angle, the first lookup table generates a first or high threshold value that corresponds to a very low y-acceleration, and the second look-up table generates a second or low threshold value that corresponds to a very large y-acceleration. If the magnitude of the y-acceleration is very small, then the vehicle is less prone to experience a trip rollover event and the high-threshold value is selected. If the magnitude of the y-acceleration is very large, then the vehicle is more prone to experience a trip rollover event and the low-threshold value is selected. As is discussed further below, the continuously variable threshold module 365 selects a value between the first and second thresholds depending on the y-acceleration.

The first and second look-up tables provide high and low thresholds that vary depending on the vehicle model. For one embodiment, the tables use known conservation of energy tables for the vehicle model that are then modified based on obtained crash-test data. The initial conservation of energy tables are based on vehicle parameters (e.g., mass, location of the center of gravity of the vehicle, the moment of inertia of the vehicle, etc.), and are used to determine how much kinetic energy is required to roll the vehicle. The amount of kinetic energy required to roll the vehicle is proportional to the angular rate required to rotate the vehicle past the critical angle of the vehicle (i.e., the angle at which the vehicle "tips-over"). The crash-test data is used to adjust the tables, and takes into account variables not factored into the original conservation of energy tables (e.g., spring constants, the affect of loads within the vehicle, etc.).

Referring again to FIGS. 3a and 3b, the first threshold value is provided to the first z-factor module 350. The z-factor module 350 modifies the first threshold value by a value proportional to the z-acceleration. For example, the z-acceleration may be multiplied by a first scaling factor and then subtracted (or added) to the magnitude of the first threshold value. If the z-acceleration is high, then the first threshold may be reduced (or increased) by a larger value than if the z-acceleration is low. The first scaling factor varies depending on the vehicle module crash test data for the vehicle module. In one embodiment, the first scaling factor may be zero (i.e., the analysis module 170 does not take into consideration the z-acceleration).

Similar to the first threshold value, the second threshold value is provided to the second z-factor module 355. The second z-factor module 355 includes a second scaling factor, which may be different than the first scaling factor, and performs similar to the first z-factor module 350.

The modified first and second thresholds are provided to a continuously variable threshold module 365, which also receives the magnitude of the y-acceleration value. The continuously variable threshold module 365 generates the angular-rate threshold based on the magnitude of the y-acceleration. For a first example embodiment, the continuously variable threshold module 365 sets the angular-rate threshold to the first threshold value if the magnitude of the y-acceleration is less than a y-acceleration selection value, and sets the angular-rate threshold to the second threshold value if the magnitude of the y-acceleration is greater than the y-acceleration selection value.

For a second example embodiment, the continuously variable threshold module interpolates the angular-rate threshold between the first and second threshold values based on the magnitude of the y-acceleration. For a specific second example, the continuously variable threshold module 365 may create a line between the high threshold value (e.g., corresponding to a y-acceleration of one g) and the low threshold value (e.g., corresponding to a y-acceleration of six g). The module 365 then sets the angular rate threshold to a value between the high and low values based on the magnitude of the y-acceleration (e.g., if the y-acceleration is 3.5 g, then the angular rate threshold is the median of the high and low threshold values). The angular rate threshold generated by the continuously variable threshold module 365 is provided to a third path selection module 375.

As shown in FIG. 3a, a comparator 380 receives the magnitude of the vehicle angle, and compares the vehicle angle to a minimum angle threshold. If the minimum angle threshold is greater than or equal to the minimum angle, a logic value of one is provided to path selection module 375. Otherwise, a value of zero is provided to the path selection module 375. The path selection module 375 selects either the angular rate threshold or a maximum threshold depending on whether the vehicle angle is greater or less than the minimum angle threshold. If the magnitude of the vehicle angle is less than the minimum angle threshold, then the path selection 275 passes a maximum threshold. In some embodiments, if the vehicle angle is less than the minimum angle, then the vehicle is prevented from firing even if the angular rate is high. To accomplish this, the angular rate threshold is set to an unobtainable threshold value. Otherwise, the angular rate threshold is set to the rate set by the analysis module 370.

As shown in FIG. 3b, the angular rate threshold is compared to the magnitude of the filtered angular rate in the comparator 315. If the magnitude of the filtered angular rate is greater than the angular rate threshold, then a logic value of one, signifying a trip rollover condition, is provided to AND gate 375. Otherwise, a logic value of zero is provided to AND gate 375.

In comparator 310, the sign of the angular rate is compared to the sign of the angle. If the two signs are the same, then a logic value of one is provided to the AND gate 375. Otherwise a logic value of zero is provided to the AND gate 375. A logic value of zero signifies that the magnitude of the vehicle roll angle is decreasing (i.e., the vehicle is returning to a "stable" state).

The AND gate 375 receives the results from the comparators 310 and 315. If both comparators provide a logic value of one, then the AND gate 375 generates a logic value of one. Otherwise, a logic value of zero is generated. The output of AND gate 375 is the fire stage 1 signal. In addition, a logic one is provided to a step counter 385. The step counter 385 times how long the AND gate 375 generates the logic value of one. The counted time is compared to a time period in comparator module 390. If the counted time is greater than the time period, signifying a trip rollover is likely occurring, then the comparator 390 generates a logic value of one. Otherwise, the comparator 390 generates a logic value of zero. The output of comparator 390 is the fire stage 2 signal.

As can be seen from the above, the invention provides a new and useful rollover-sensing system and method of operating the same. Various features and advantages of the invention are set forth in the following claims.

What is claimed is:

1. A method of activating a safety device of a vehicle having x, y, and z-axes, the method comprising:
   generating a y-acceleration signal representative of the acceleration of the vehicle in the direction of the y-axis;
   generating an angular-rate signal representative of the angular velocity of the vehicle about the x-axis;
   generating a z-acceleration signal representative of the acceleration of the vehicle in the direction of the z-axis;
   calculating a vehicle angle having a relationship to the angular-rate signal, and being representative of the angle of the vehicle about the x-axis;
   calculating an angular-rate threshold having a relationship to the vehicle angle and the y-acceleration signal;
   determining whether a rollover condition exists, including comparing the angular-rate signal to the angular-rate threshold;
   confirming the plausibility of the rollover condition, including analyzing the y-acceleration signal and the z-acceleration signal; and
   activating a first safety device when the magnitude of the angular-rate signal is greater than the angular-rate threshold and when the plausibility of the rollover condition is confirmed.

2. A method as set forth in claim 1 further comprising activating a second safety device when the magnitude of the angular-rate signal is greater than the angular-rate threshold for a continuous time period.

3. A method as set forth in claim 2 wherein the first safety device is a seat-belt restraint system, and wherein the second safety device is an air-bag deployment system.

4. A method as set forth in claim 1 wherein calculating an angular-rate threshold includes
   providing a y-acceleration selection value;
   obtaining a first threshold value having a relationship to the vehicle angle;
   obtaining a second threshold value having a second relationship to the vehicle angle, the second threshold value being less than the first threshold value; setting the angular-rate threshold to the second threshold value if the magnitude of the y-acceleration signal is less than the y-acceleration selection value; and
   setting the angular velocity threshold to the second threshold value if the magnitude of the y-acceleration signal is greater than the y-acceleration selection value.

5. A method as set forth in claim 1 wherein calculating an angular-rate threshold includes
   obtaining a first threshold value having a relationship to the angle;
   obtaining a second threshold value having a relationship to the angle, the second threshold value being less than the first threshold value; and
   interpolating the angular-rate threshold between the first and second threshold values based on a magnitude of the y-acceleration signal.

6. A method as set forth in claim 5 wherein interpolating the angular-rate threshold is performed using linear interpolation.

7. A method as set forth in claim 1 wherein calculating an angular-rate threshold includes calculating an angular-rate threshold having a relationship to the angle, the y-acceleration signal, and the z-acceleration signal.

8. A method as set forth in claim 7 wherein calculating an angular-rate threshold having a relationship to the angle, the y-acceleration signal, and the z-acceleration signal includes:
   obtaining a first threshold value;
   obtaining a second threshold value less than the first threshold value;
   modifying the first threshold value based on the z-acceleration signal; and
   modifying the second threshold value based on the z-acceleration signal.

9. A method as set forth in claim 1 wherein calculating an angular-rate threshold includes setting the angular-rate threshold to a maximum threshold if the vehicle angle is less than a minimum angle.

10. A method as set forth in claim 1 wherein the method includes providing a y-acceleration threshold, and wherein comparing the angular-rate signal to the angular-rate threshold occurs when the magnitude of the y-acceleration signal is greater than the y-acceleration threshold.

11. A method as set forth in claim 10 wherein the method further includes:
   calculating a second angular-rate threshold having a relationship to the vehicle angle; and
   comparing the angular-rate to the second angular-rate threshold when the magnitude of the y-acceleration signal is less than the acceleration threshold.

12. A vehicle as set forth in claim 1 wherein the method further includes comparing the vehicle angle to a minimum vehicle angle and wherein the activating of the first safety device includes activating the first safety device when the magnitude of the angular-rate signal is greater than the angular-rate threshold, when the plausibility of the possible rollover condition is confirmed, and when the vehicle angle is greater than a minimum vehicle angle.

13. A vehicle having x, y, and z-axes, the vehicle comprising:
   a frame;
   a first accelerometer connected to the frame, the first accelerometer being operable to generate a y-acceleration signal representative of the acceleration of the vehicle in the direction of the y-axis;
   a second accelerometer connected to the frame, the second accelerometer being operable to generate a z-acceleration signal representative of the acceleration of the vehicle in the direction of the z-axis;
   an angular-rate sensor connected to the frame, the angular-rate sensor being operable to generate an angular rate signal representative of the angular velocity of the vehicle about the x-axis;
   a microcontroller connected to the frame, and coupled with the accelemerometers and the angular-rate sensor, the microcontroller being operable to
     receive the y-acceleration signal, the z-acceleration signal, and the angular-rate signal,
     calculate a vehicle angle having a relationship to the angular-rate signal and being representative of the angle of the vehicle about the x-axis,
     calculate an angular-rate threshold having a relationship to the vehicle angle and the y-acceleration signal,
     determine whether a rollover condition exists, including comparing the angular-rate signal to the angular-rate threshold,
     confirming the plausibility of the rollover condition, including analyzing the y-acceleration signal and the z-acceleration signal, and
     generate an output signal when the magnitude of the angular-rate signal is greater than the angular-rate threshold and when the plausibility of the rollover condition is confirmed; and
   a safety device connected to the frame and coupled to the microcontroller, the safety-device being activatable in response to receiving the output signal.

14. A vehicle as set forth in claim 13 wherein the microcontroller is further operable to generate a second output signal when the magnitude of the angular-rate signal is greater than the angular-rate threshold for a continuous time period, and wherein the vehicle further comprises a second safety-device connected to the frame and coupled to the microcontroller, the second safety-device being activatable in response to receiving the second output signal.

15. A vehicle as set forth in claim 14 wherein the first safety device is a seat-belt restraint system, and wherein the second safety-device is an air-bag deployment system.

16. A vehicle as set forth in claim 13 wherein the microcontroller calculates an angular-rate threshold by being further operable to
   obtain a first threshold value having a relationship to the vehicle angle,
   obtain a second threshold value having a relationship to the vehicle angle, the second threshold value being less than the first threshold value,
   set the angular-velocity threshold to the first threshold value if the magnitude of the y-acceleration signal is less than a y-acceleration selection value, and
   set the angular-velocity threshold to the second threshold if the magnitude of the y-acceleration signal is greater than the y-acceleration selection value.

17. A vehicle as set forth in claim 13 wherein the microcontroller calculates an angular-rate threshold by being further operable to
   obtain a first threshold value having a relationship to the vehicle angle,
   obtain a second threshold value having a relationship to the vehicle angle, the second threshold value being less than the first threshold value; and
   interpolate the angular-rate threshold between the first and second threshold values based on a magnitude of the y-acceleration signal.

18. A vehicle as set forth in claim 17 wherein the interpolating of the angular-velocity is performed by linear interpolation.

19. A vehicle as set forth in claim 13 wherein the microcontroller calculates an angular-rate threshold by being further operable to calculate an angular-rate threshold having a relationship to the angle, the y-acceleration signal, and the z-acceleration signal.

20. A vehicle as set forth in claim 19 wherein the microcontroller calculates of an angular-rate threshold having a relationship to the angle, the y-acceleration signal, and the z-acceleration signal by being further operable to
   obtain a first threshold value having a relationship to the vehicle angle,
   obtain a second threshold value having a relationship to the vehicle angle, the second threshold value being less than the first threshold value,
   modify the first threshold value based on the z-acceleration signal, and modify the second threshold value based on the z-acceleration signal.

21. A vehicle as set forth in claim 13 wherein the microcontroller calculates an angular-rate threshold by being further operable to set the angular-rate threshold to a maximum threshold if the vehicle angle is less than a minimum angle.

22. A vehicle as set forth in claim 13 wherein the microcontroller is further operable to
provide a y-acceleration threshold, and
compare the angular-rate signal to the angular-rate threshold when the magnitude of the y-acceleration signal is greater than the y-acceleration threshold.

23. A vehicle as set forth in claim 22 wherein the microcontroller is further operable to
calculate a second angular-rate threshold having a relationship to the vehicle angle; and
compare the angular-rate signal to the second angular-rate threshold when the magnitude of the y-acceleration signal is less than the y-acceleration threshold.

24. A rollover sensing system for a vehicle having x, y and z-axes, the system comprising:
an accelerometer being operable to generate a y-acceleration signal representative of the acceleration of the vehicle in the direction of the y-axis;
an angular-rate sensor being operable to generate an angular rate signal representative of the angular velocity of the vehicle about the x-axis;
a microcontroller coupled with the accelerometer and the angular-rate sensor, the microcontroller being operable to
receive the y-acceleration signal and the angular-rate signal,
calculate a vehicle angle having a relationship to the angular-rate signal and being q representative of the angle of the vehicle about the x-axis,
calculate an angular-rate threshold having a relationship to the vehicle angle and the y-acceleration signal,
determine whether a rollover condition exists, including comparing the angular-rate signal to the angular-rate threshold,
confirm the plausibility of the rollover condition, and
generate an output when the magnitude of the angular-rate signal is greater than the angular-rate threshold and when the plausibility of the rollover condition is confirmed; and
wherein the microcontroller calculates an angular-rate threshold by being further operable to
obtain a first threshold value having a relationship to the vehicle angle,
obtain a second threshold value having a relationship to the vehicle angle, the second threshold value being less than the first threshold value,
set the angular-velocity threshold to the first threshold value if the magnitude of the y-acceleration signal is less than a y-acceleration selection value, and
set the angular-velocity threshold to the second threshold if the magnitude of the y-acceleration signal is greater than the y-acceleration selection value.

25. A system as set forth in claim 24 wherein the microcontroller is further operable to generate a second output when the magnitude of the angular-rate signal is greater than the angular-rate threshold for a continuous time period.

26. A system as set forth in claim 24 wherein the system further includes a second accelerometer being operable to generate a z-acceleration signal correlated with the acceleration of the vehicle in a z-axis, wherein the microcontroller calculates an angular-rate threshold by being further operable to calculate an angular-rate threshold having a relationship to the angle, the y-acceleration signal, and the z-acceleration signal.

27. A system as set forth in claim 26 wherein the microcontroller calculates of an angular-rate threshold having a relationship to the angle, the y-acceleration signal, and the z-acceleration signal by being further operable to
obtain a first threshold value having a relationship to the vehicle angle,
obtain a second threshold value having a relationship to the vehicle angle, the second threshold value being less than the first threshold value,
modify the first threshold value based on the z-acceleration signal, and
modify the second threshold value based on the z-acceleration signal.

28. A system as set forth in claim 24 wherein the microcontroller calculates an angular-rate threshold by being further operable to set the angular-rate threshold to a maximum threshold if the vehicle angle is less than a minimum angle.

29. A rollover sensing system for a vehicle having x, y and z-axes, the system comprising:
an accelerometer being operable to generate a y-acceleration signal representative of the acceleration of the vehicle in the direction of the y-axis;
an angular-rate sensor being operable to generate an angular rate signal representative of the angular velocity of the vehicle about the x-axis;
a microcontroller coupled with the accelerometer and the angular-rate sensor, the microcontroller being operable to
receive the y-acceleration signal and the angular-rate signal,
calculate a vehicle angle having a relationship to the angular-rate signal and being representative of the angle of the vehicle about the x-axis,
calculate an angular-rate threshold having a relationship to the vehicle angle and the y-acceleration signal,
determine whether a rollover condition exists, including comparing the angular-rate signal to the angular-rate threshold,
confirm the plausibility of the rollover condition, and
generate an output when the magnitude of the angular-rate signal is greater than the angular-rate threshold and when the plausibility of the rollover condition is confirmed; and
wherein the microcontroller calculates an angular-rate threshold by being further operable to
obtain a first threshold value having a relationship to the vehicle angle,
obtain a second threshold value having a relationship to the vehicle angle, the second threshold value being less than the first threshold value; and
interpolate the angular-rate threshold between the first and second threshold values based on a magnitude of the y-acceleration signal.

30. A system as set forth in claim 29 wherein the interpolating of the angular-velocity is performed by linear interpolation.

31. A system as set forth in claim 29 wherein the microcontroller is further operable to generate a second output when the magnitude of the angular-rate signal is greater than the angular-rate threshold for a continuous time period.

32. A system as set forth in claim 29 wherein the system further includes a second accelerometer being operable to generate a z-acceleration signal correlated with the acceleration of the vehicle in a z-axis, wherein the microcontroller calculates an angular-rate threshold by being further operable to calculate an angular-rate threshold having a relationship to the angle, the y-acceleration signal, and the z-acceleration signal.

33. A system as set forth in claim 32 wherein the microcontroller calculates an angular-rate threshold having a relationship to the angle, the y-acceleration signal, and the z-acceleration signal by being further operable to obtain a first threshold value having a relationship to the vehicle angle, obtain a second threshold value having a relationship to the vehicle angle, the second threshold value being less than the first threshold value, modify the first threshold value based on the z-acceleration signal, and modify the second threshold value based on the z-acceleration signal.

34. A method of sensing the occurrence of a rollover event for a vehicle having x, y, and z axes, the method comprising:

determining a y-acceleration of the vehicle in the direction of the y-axis;

determining an angular-rate of the vehicle about the x-axis;

determining a vehicle angle of the vehicle about the x-axis;

determining an angular-rate threshold having a relationship to the vehicle angle and the y-acceleration signal;

determine whether a rollover condition exists, including comparing the magnitude of the angular rate to the angular-rate threshold;

confirming the plausibility of the rollover condition; and generating an output signal when the magnitude of the angular rate is greater than the angular-rate threshold and when the plausibility of the rollover condition is confirmed; and wherein determining an angular-rate threshold includes
determining a first threshold value having a relationship to the angle;
determining a second threshold value having a relationship to the angle, the second threshold value being less than the first threshold value; and
interpolating the angular-rate threshold between the first and second threshold values based on a magnitude of the y-acceleration signal.

35. A method as set forth in claim 34 wherein determining an angular-rate of the vehicle includes sensing an angular rate of the vehicle about the x-axis, generating an angular rate signal having a relationship to the sensed angular rate, and filtering the angular rate signal, and wherein determining a y-acceleration includes sensing a y-acceleration of the vehicle in the direction of the y-axis, generating a y-acceleration signal having a relationship to the sensed y-acceleration, and filtering the y-acceleration signal.

36. A method as set forth in claim 34 wherein determining a vehicle angle includes calculating the vehicle angle using a relationship to the angular rate.

37. A method as set forth in claim 34 and further comprising:

providing a time period;

increasing a counter when the magnitude of the angular rate is greater than the angular-rate threshold; and generating a second output signal when the counter is greater than the time period.

38. A method as set forth in claim 37 wherein the vehicle includes first and second safety devices, and wherein the method further comprises:

providing the first output signal to a first safety device; and providing the second output signal to a second safety device.

39. A method as set forth in claim 34 wherein interpolating the angular-rate threshold is performed using linear interpolation.

40. A method as set forth in claim 34 wherein the method further comprises determining a z-acceleration of the vehicle in the direction of the z-axis, and wherein determining an angular-rate threshold includes determining an angular-rate threshold having a relationship to the angle, the y-acceleration, and the z-acceleration.

41. A method as set forth in claim 40 wherein determining an angular-rate threshold having a relationship to the angle, the y-acceleration, and the z-acceleration includes:

determining a first threshold value;

determining a second threshold value greater than the first threshold value;

modifying the first threshold value based on the z-acceleration; and modifying the second threshold value based on the z-acceleration.

42. A method as set forth in claim 34 wherein determining an angular-rate threshold includes:

setting the angular-rate threshold to a maximum threshold if the vehicle angle is less than a minimum angle.

43. A method of sensing the occurrence of a rollover event for a vehicle having x, y, and z axes, the method comprising:

determining a y-acceleration of the vehicle in the direction of the y-axis;

determining an angular-rate of the vehicle about the x-axis;

determining a vehicle angle of the vehicle about the x-axis;

determining an angular-rate threshold having a relationship to the vehicle angle and the y-acceleration signal;

determine whether a rollover condition exists, including comparing the magnitude of the angular rate to the angular-rate threshold;

confirming the plausibility of the rollover condition; and generating an output signal when the magnitude of the angular rate is greater than the angular-rate threshold and when the plausibility of the rollover condition is confirmed; and wherein determining an angular velocity threshold includes:
providing a y-acceleration selection value;
determining a first threshold value having a relationship to the vehicle angle;
determining a second threshold value having a second relationship to the vehicle angle, the second threshold value being less than the first threshold value;
setting the angular velocity threshold to the second threshold value if the magnitude of the y-acceleration is greater than the y-acceleration value;

setting the angular velocity threshold to the second threshold value if the magnitude of the y-acceleration is less than the y-acceleration value.

44. A method as set forth in claim 43 and further comprising:
providing a time period;
increasing a counter when the magnitude of the angular rate is greater than the angular-rate threshold; and
generating a second output signal when the counter is greater than the time period.

45. A method as set forth in claim 44 wherein the vehicle includes first and second safety devices, and wherein the method further comprises:
providing the first output signal to a first safety device; and
providing the second output signal to a second safety device.

46. A method as set forth in claim 43 wherein the method further comprises determining a z-acceleration of the vehicle in the direction of the z-axis, and wherein determining an angular-rate threshold includes determining an angular-rate threshold having a relationship to the angle, the y-acceleration, and the z-acceleration.

47. A method as set forth in claim 46 wherein determining an angular-rate threshold having a relationship to the angle, the y-acceleration, and the z-acceleration includes:
determining a first threshold value;
determining a second threshold value greater than the first threshold value;
modifying the first threshold value based on the z-acceleration; and
modifying the second threshold value based on the z-acceleration.

48. A rollover-sensing system for a vehicle including x, y, and z-axes, a frame, and a safety-device connected to the frame, the system comprising:
an accelerometer being operable to generate a y-acceleration signal representative of the acceleration of the vehicle in the direction of the y-axis;
an angular-rate sensor being operable to generate an angular rate signal representative of the angular velocity of the vehicle about the x-axis;
a processing unit and memory coupled with the accelerometer and the angular-rate sensor, the memory including one or more software modules having instructions that are executable by the processing unit, the software modules including
an integrator that receives the angular rate signal and calculates a vehicle angle;
a trip criteria module that receives the angular rate signal, vehicle angle, and y-acceleration signal, analyzes the angular rate signal, vehicle angle, and y-acceleration signal to generate a first output signifying a trip rollover event; and
wherein the trip criteria module includes
a first magnitude value module that receives the angular rate signal and produces an angular-rate magnitude,
a second magnitude value module that receives the vehicle angle and produces a vehicle-angle magnitude,
a third magnitude value module that receives the y-acceleration signal and produces a y-acceleration magnitude,
an analysis module that generates an angular rate threshold having a relationship to the vehicle-angle magnitude and the y-acceleration magnitude, and
a comparator that compares the angular-rate threshold to the angular-rate magnitude.

49. A system as set forth in claim 48 wherein the analysis module includes
a first look-up table that receives the vehicle-angle magnitude and generates a first threshold value having a relationship to the vehicle-angle magnitude,
a second look-up table that receives the vehicle-angle magnitude and generates a second threshold value having a relationship to the vehicle-angle magnitude, the second threshold value being less than the first threshold value, and
a continuously variable threshold module that receives the vehicle-angle magnitude, the first threshold, and the second thresholds, and interpolates the angular-rate threshold between the first and second thresholds based on the y acceleration magnitude.

50. A system as set forth in claim 49 wherein the interpolation is a linear interpolation.

51. A system as set forth in claim 49 wherein the system further comprises a second accelerometer being operable to generate a z-acceleration signal representative of the acceleration of the vehicle in the direction of the z-axis, wherein the analysis module generates an angular rate threshold having a relationship to the vehicle-angle magnitude, the y-acceleration magnitude, and the z-acceleration.

52. A system as set forth in claim 51 wherein the analysis module further includes a first z-factor module that receives the first threshold value and the z-acceleration magnitude, and modifies the first threshold value based on the z-acceleration magnitude.

53. A system as set forth in claim 52 wherein the analysis module further includes a second z-factor module that receives the second threshold value and the z-acceleration magnitude, and modifies the second threshold value based on the z-acceleration magnitude.

54. A system as set forth in claim 48 wherein the analysis module includes
a first look-up table that receives the vehicle angle and generates a first threshold value having a relationship to the vehicle angle,
a second look-up table that receives the vehicle angle and generates a second threshold value having a relationship to the vehicle angle, the second threshold value being greater than the first threshold value, and
a continuously variable threshold module that receives the vehicle angle, and the first and second thresholds, sets the angular-rate threshold to the first value if the y-acceleration is less than a y-acceleration selection value, and sets the angular-rate threshold to the second value if the y-acceleration is greater than a y-acceleration selection value.

* * * * *